United States Patent

[11] 3,597,974

[72] Inventors Jay I. Black
Orange;
Robert A. Hatch, Stratford, both of, Conn.
[21] Appl. No. 30,035
[22] Filed Apr. 20, 1970
[45] Patented Aug. 10, 1971
[73] Assignee Avco Corporation
Stratford, Conn.

[54] FLUIDIC TEMPERATURE SENSOR FOR GAS TURBINE ENGINES
10 Claims, 4 Drawing Figs.
[52] U.S. Cl. .................................................. 73/339 A,
73/344, 73/346, 73/351
[51] Int. Cl. ...................................................... G01k 1/14,
G01k 11/26
[50] Field of Search.......................................... 73/339 A,
357, 339 R, 346, 349, 351, 344

[56] References Cited
UNITED STATES PATENTS
3,403,509 10/1968 Eastman et al. .............. 73/339 X
3,494,195 2/1970 Kelley et al. .................. 73/357 X Primary Examiner—Louis R. Prince
Assistant Examiner—Frederick Shoon
Attorneys—Charles M. Hogan and Gary M. Gron ABSTRACT: The disclosure illustrates a fluidic temperature sensor comprising a fluidic oscillator mounted in a blade of the turbine assembly of a gas turbine engine. The oscillator has an inlet which receives hot gas through which the blade rotates. An open-ended signal output tube extends from the oscillator to the periphery of the blade. A generally conical stationary receiver port is positioned in a circumferential shroud which surrounds the turbine blade and receives the pressure oscillation signals emanating from the fluidic oscillators in the blade. The period of response for the oscillator is selected so that the resultant pressure frequency signal at the receiver port is an average of the temperature of the gas through which the blade passes in between successive passes over the receiver port.

Patented Aug. 10, 1971
3,597,974
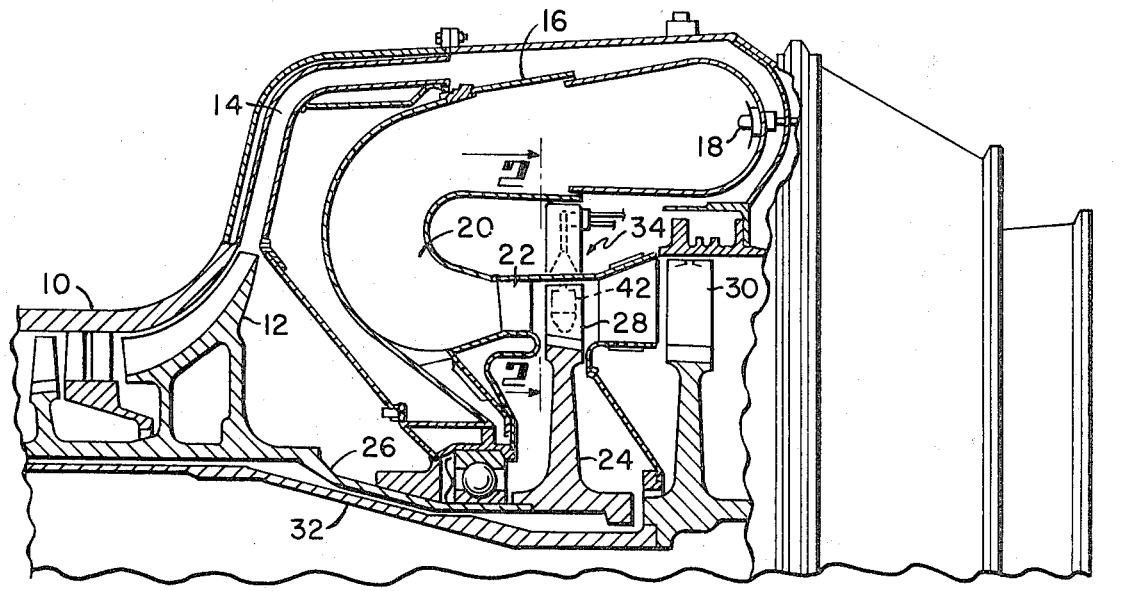
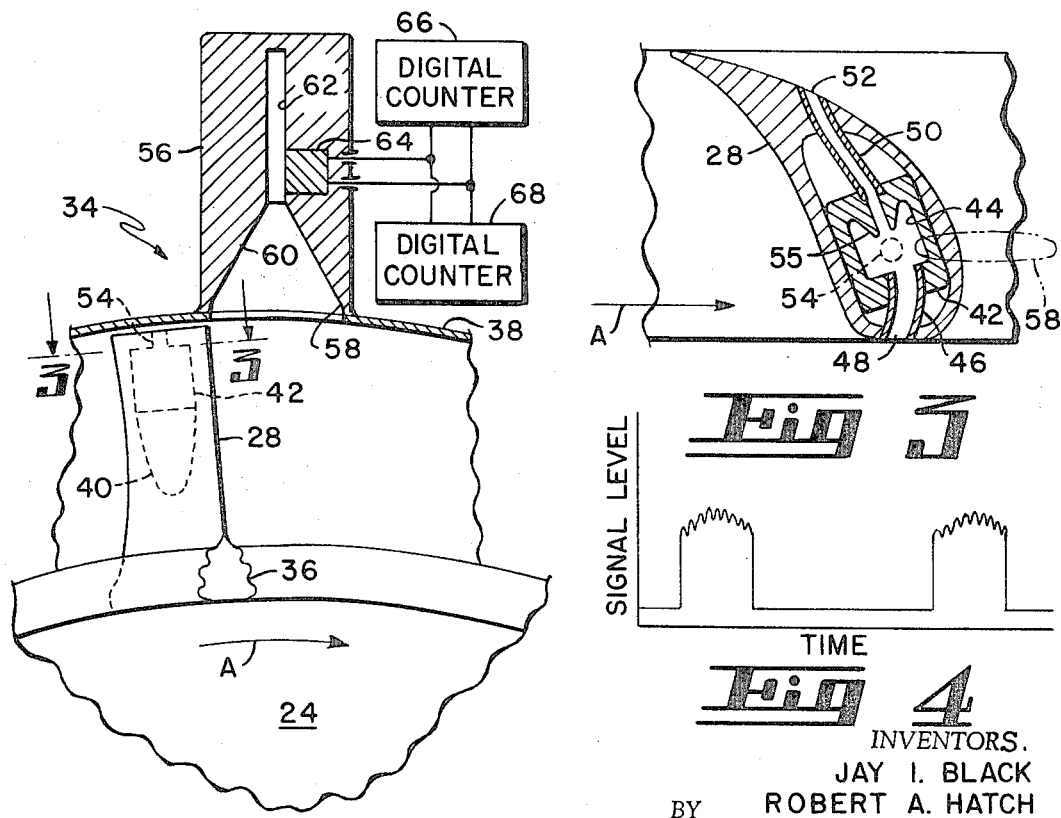
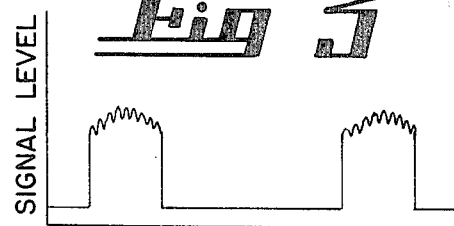
INVENTORS.
JAY I. BLACK
BY ROBERT A. HATCH
*Charles M. Hogan*
*Gary M. Gron*
ATTORNEYS.

FLUIDIC TEMPERATURE SENSOR FOR GAS TURBINE ENGINES

In recent years it has become desirable to incorporate fluidic temperature sensors in gas turbine engines to measure turbine inlet temperatures. The reason for this is that the fluidic temperature sensor can withstand prolonged elevated temperatures far more successfully than prior art thermocouples. In addition, fluidic temperature sensors are inherently rugged and inexpensive to manufacture and have a fast dynamic response.

Briefly, the fluidic oscillator comprises a resonant chamber which has an inlet extending to the gas whose temperature is to be measured and an outlet extending to a lower pressure discharge. A sufficient pressure differential is then established across the resonant chamber to promote pressure oscillations in the gas within the chamber. The frequency of these oscillations is directly proportional to the absolute temperature of the gas in the chamber and these oscillations are transformed into a usable signal by a suitable transducer.

The fluidic oscillators have proven to be quite effective in providing an accurate and highly responsive means to measure turbine inlet temperature. However, in the gas turbine engine having an annular gas flow path a particular problem arises in the fact that very frequently there are wide circumferential variations in the temperature of the gas passing through the engine. If a sensor is located at one circumferential point in the flow path, it only measures the temperature at that point in the flow path, it only measures the temperature at that point and not an average temperature. This necessitates the use of a plurality of sensors spaced around the circumference of the annular flow path through the engine. This, of course, creates added complexities and expense in the system.

Accordingly, it is an object of the present invention to provide a highly simplified, inexpensive and effective fluidic temperature sensor which inherently measures the average temperatures found in a gas turbine engine.

The above ends are achieved according to the present invention by a fluidic temperature sensor assembly for use in a gas turbine engine. The assembly comprises a fluidic oscillator mounted on a blade of a rotor which rotates so that the radially extending blade passes through a motive fluid stream passing through the engine. The fluidic oscillator receives the motive fluid stream from the upstream portion of the blade and has an open signal outlet passageway extending radially to the periphery of the blade. A stationary receiver port is mounted in a shroud closely adjacent the peripheral path of the blade for receiving pressure oscillation signals from the signal outlet passageway as the blade passes across the receiver port. A means is connected to the receiver port for providing a signal output directly proportional to the frequency of the pressure oscillations in the receiver port. Thus the sensor gives an output proportional to the average of the motive fluid stream temperature through which the blade rotates.

The above and other related objects and features of the present invention will be apparent from a reading of the description of the disclosure shown in the accompanying drawing and the novelty thereof pointed out in the appended claims.

In the drawing:

FIG. 1 is a partial longitudinal section view of a gas turbine engine with which a fluidic temperature sensor embodying the present invention is used;

FIG. 2 is an enlarged view particularly illustrating the fluidic temperature sensor shown in FIG. 1 and taken on lines 2–2 of FIG. 1;

FIG. 3 is a view taken on lines 3–3 of FIG. 2;

FIG. 4 is a graph illustrating the signal level output from the fluidic temperature sensor shown in FIG. 1.

DESCRIPTION OF THE INVENTION

Referring particularly to FIG. 1 there is shown a gas turbine engine comprising an outer casing 10. A compressor assembly is located within the casing 10 and has a bladed rotor 12 which rotates to pressurize and discharge air through a diffuser 14 for entry into a perforated combustor 16. Fuel is injected into the combustor 16 by a nozzle 18 and the resultant mixture ignited by well-known means to produce a propulsive motive fluid stream. The motive fluid stream passes through a turning duct 20 and through a turbine inlet nozzle 22. A rotor 24, connected to the compressor rotor 12 via shaft 26, has a plurality of turbine blades 28 extending radially therefrom and adapted to rotate when the motive fluid stream is discharged across them from the turbine inlet nozzle assembly 22. From the turbine blades 28 the motive fluid stream passes across a power turbine assembly 30 which causes it to drive an output shaft 32. In another form of engine the motive fluid stream may be discharged from a nozzle to provide a reaction propulsion.

In accordance with the present invention the motive fluid stream temperature at the inlet to the turbine rotor 24 is sensed by the fluidic temperature sensor assembly generally indicated by reference character 34. As shown particularly in FIG. 2, the fluidic temperature sensor assembly 34 is used in cooperation with one of the blades 28 of the turbine rotor assembly which is received in dovetail slots 36 in the rotor 24. Only one of the blades is shown for purposes of clarity. A circumferential shroud 38 is positioned closely adjacent the peripheral path of the blade 28 as it rotates about the axis of the rotor.

Within a chamber 40 of the blade 28 a fluidic oscillator 42 is mounted. As seen particularly in FIG. 3, the fluidic oscillator 42 has a resonant chamber 44 and a tubular inlet 46 extending to an opening 48 in the upstream side of the blade 28. A tubular outlet 50 extends from the chamber 44 to a downstream opening 52.

A pair of splitters 55 in the resonant chamber 44 act to promote a pressure oscillation in the chamber whose frequency is directly proportional to the absolute temperature of the fluid in the chamber. These pressure oscillations are conveyed through an open signal conduit 54 which extends radially to the outer periphery of blade 28.

As shown in FIG. 2, a stationary receiver port assembly 56 is positioned on the shroud 38 so that the blade 28 makes successive passes over the receiver port upon rotation of the turbine rotor disk 24. The receiver port has an elongated opening 58 (shown in phantom in FIG. 3) which is elongated in the direction of rotation of the blade 28. The opening 58 converges through a generally conical inlet portion 60 to an elongated closed end passage 62 of a smaller cross-sectional area. A pressure transducer 64 is positioned in the receiver port assembly 56 adjacent the open end of the passage 62.

The pressure transducer 64 may be one of a number of types of transducers suitable for this purpose. For example, the transducer 64 may be a piezoelectric crystal which produces a voltage signal in response to pressure applied to a crystal. These signals are fed to parallel connected electronic digital counters 66 and 68. As explained later, digital counter 66 is adapted to count high frequency pulses and digital counter 68 is adapted to count lower frequency pulses.

In operation, the turbine disk 24 rotates and the blades 28 travel in the direction of the arrows A. At the same time the motive fluid stream passes across the blades to a downstream position. The inlet 48 of the fluidic oscillator 42 is positioned so that it faces the direction of the impinging inlet gas relative velocity on the blade 28. As a result, the pressure at opening 48 is the static pressure of the motive fluid at that point plus the relative velocity pressure of the motive fluid due to the movement of the blade 28. The outlet 52 is connected to a point of low static pressure in the turbine blade. This causes the pressure at outlet 52 to be static pressure of the motive fluid at that point minus the velocity pressure of the fluid. The net result of the pressure variations is that an extremely high-pressure differential is established across the resonant chamber 44. This causes the outlet of the resonant chamber 44 to choke for substantially all operating conditions of the engine, thereby making the oscillator substantially independent of pressure variations in the motive fluid and increasing its accuracy.

As the blade 28 passes circumferentially through the motive fluid stream, it receives motive fluid continuously around the circumference of the wheel. The pressure oscillations are passed through conduit 54 and when the blade 28 registers with the receiver port opening 58 the pressure oscillations are discharged into the pressure receiver port assembly 56.

These pressure oscillations cause identical oscillations in the conical entry 60 in the closed end conduit 62. This in turn causes the transducer 64 to generate an output signal proportional to the pressure oscillations in the receiver port assembly 56. Since the inlet portion 60 converges and the pressure oscillations are supersonic oscillations, their pressure is increased by the inlet portion 60 which acts as a supersonic diffuser. The elongated portion of passage 62 beyond the pressure transducer 64 provides a heat sink for the motive fluid passing into the chamber and enables the pressure transducer 64 to be maintained at a reasonable temperature.

The signal output from the pressure transducer 64 is as shown in FIG. 4 which illustrates its signal level versus time. The peaks occur when the blade 28 passes across the receiver port 56. The frequency of the generally high frequency oscillations forming the peak represent the temperature signal received from the fluidic oscillator in the blade 28. The spaced pulses represent the time at which the blade 28 passes across the receiver port. The rotational speed of the disk 24 may therefore be determined by utilizing the spaced pulses of the pressure signal transducer. This is accomplished by the parallel connected digital counters 66, 68. The counter 66 is gated so that it only counts high frequency pulses and therefore the temperature of the motive fluid stream. The digital counter 68 is gated to count lower frequency pulses which represent the r.p.m. of the disk 24. In some counters it may be possible to put the signal into two channels, one with a high frequency and the other with a low frequency.

As the blade passes through the motive fluid stream, gas is continually entering and leaving the resonant chamber. The purge time of the chamber 44 or, in other words, the time constant of the oscillator is selected by varying the dimensions of the chamber 44 so that as the blade rotates between successive passes of the receiver port 56, the fluid remains in the resonant chamber 44 for a sufficient time so that the output signal, when discharged into the receiver port assembly 56, represents an average of a substantial segment of the path through which the blade 28 passes. It should be noted that the blade 28 for normal turbine operation rotates at a sufficiently high rate so that a fluidic oscillator with even a high response rate will give an average temperature result.

It is desirable for balancing reasons to employ a pair of fluidic oscillators in blades of the turbine disk 24. For this purpose a second oscillator assembly 70 is positioned in a blade 28', 180° from the blade 28 containing fluidic oscillator 42 as shown in FIG. 1. Not only does this arrangement give a proper balance to the rotor but it enables a much greater sampling of the motive fluid passing across the disk without an undue complication of the system.

The temperature sensor assembly described above, while described in specific connection with the first stage turbine assembly of a gas producer, may be employed for other rotating bladed portions of a gas turbine engine with equal advantage.

What we claim as novel and desired to be secured by Letters Patent of the United States is:

1. A fluidic temperature sensor assembly for use in a gas turbine engine having a rotor and radially extending blades which rotate through a motive fluid stream, said engine having a circumferential shroud closely adjacent the peripheral paths of said blades, said sensor assembly comprising:

at least one fluidic oscillator mounted on a blade of the rotor having an inlet positioned to receive said motive fluid stream and having a resonant chamber in which pressure oscillations having a frequency proportional to the temperature in the chamber are set up, said fluidic oscillator having an open signal outlet passageway extending radially to the periphery of said blade;

a stationary receiver port mounted in said shroud for receiving the acoustical signals from said signal outlet passageway as said blade rotates across said receiver port;

means connected to said receiver port for providing a signal output directly proportional to the frequency of the pressure oscillations in said receiver port;

whereby said sensor gives an output proportional to the motive fluid stream temperature through which said blade rotates.

2. A fluidic temperature sensor assembly as in claim 1 wherein said fluidic oscillator is dimensioned to have a sufficient time constant so that the signal received by said stationary receiver port represents the average of a substantial portion of the circumferential path the blade traverses between subsequent passes over said stationary receiver port.

3. A fluidic temperature sensor as in claim 1 wherein said stationary receiver port comprises a passageway having an opening elongated in the direction of the plane of rotation of said blade, whereby the acoustical pressure signals are received for a portion of the path of rotation of said blade.

4. A fluidic temperature sensor assembly as in claim 3 wherein said receiver port has an inlet portion which converges from said elongated opening to an inner reduced cross-sectional area portion, thereby to recover pressure of the signal extending between the fluidic oscillator and the stationary receiver port.

5. A fluidic temperature sensor assembly as in claim 4 wherein said passageway further comprises an elongated closed inner portion extending from said converging inlet portion, said signal output means being connected to said passageway at a position spaced from the end of said passageway, whereby said signal means is cooled.

6. A fluidic temperature sensor assembly as in claim 1 wherein a pair of fluidic oscillators are mounted on blades spaced 180° from one another on said rotor.

7. A fluidic temperature sensor assembly as in claim 1 wherein said signal output means comprises:

means for providing a signal output in direct proportion to the high frequency acoustical pulses discharged from said oscillators thereby indicating the temperature of the motive fluid stream; and means for providing a signal output in direct proportion to the presence of the acoustical signal on said receiver port whereby said signal is proportional to the speed of rotation of said rotor.

8. A fluidic temperature sensor assembly as in claim 1 wherein the resonant chamber and an inlet port of said fluidic oscillator extends to said chamber from a position facing the inlet gas relative velocity vector of said blade, whereby said oscillator receives total pressure of the fluid immediately adjacent the leading edge of said blade.

9. A fluidic temperature sensor assembly as in claim 8 wherein said oscillator further comprises an outlet extending from said resonant chamber to a discharge point facing substantially the opposite direction of said inlet.

10. A fluidic temperature sensor assembly as in claim 9 wherein said stationary receiver port comprises:

a passageway having an opening elongated in the direction of the plane of rotation of said blade, said receiver port converging from said elongated opening to an inner closed end, reduced cross-sectional elongated portion;

said signal output means being connected to said passageway at a position spaced from the end of said elongated passageway.